US008315777B2

(12) United States Patent
Nakatani et al.

(10) Patent No.: US 8,315,777 B2
(45) Date of Patent: Nov. 20, 2012

(54) CONTROL APPARATUS AND CONTROL METHOD FOR INTERNAL COMBUSTION ENGINE

(75) Inventors: Koichiro Nakatani, Mishima (JP);
Terutoshi Tomoda, Mishima (JP);
Shinobu Ishiyama, Numazu (JP);
Tomoyuki Ono, Sunto-gun (JP);
Tomoyuki Kogo, Gotenba (JP);
Yoshihiro Hisataka, Fujinomiya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 159 days.

(21) Appl. No.: 12/668,743

(22) PCT Filed: Aug. 6, 2008

(86) PCT No.: PCT/IB2008/002071
§ 371 (c)(1),
(2), (4) Date: Jan. 12, 2010

(87) PCT Pub. No.: WO2009/019579
PCT Pub. Date: Feb. 12, 2009

(65) Prior Publication Data
US 2010/0204903 A1    Aug. 12, 2010

(30) Foreign Application Priority Data

Aug. 9, 2007   (JP) ................................ 2007-208487

(51) Int. Cl.
*B60T 7/12*   (2006.01)
(52) U.S. Cl. ......... 701/103; 123/321; 123/324; 123/327

(58) Field of Classification Search .................. 701/103, 701/108, 113, 114, 115; 123/321, 345–348, 123/90.1, 90.15
See application file for complete search history.

(56) References Cited

U.S. PATENT DOCUMENTS

| 6,622,695 | B2* | 9/2003 | Kondo | 123/336 |
|---|---|---|---|---|
| 7,146,966 | B2* | 12/2006 | Nakamura | 123/481 |
| 7,287,500 | B2* | 10/2007 | Izumi et al. | 123/179.18 |
| 7,357,901 | B2* | 4/2008 | Nakatani | 423/213.2 |
| 7,475,670 | B2* | 1/2009 | Sato et al. | 123/396 |
| 7,661,403 | B2* | 2/2010 | Izumi | 123/179.16 |

(Continued)

FOREIGN PATENT DOCUMENTS

DE    100 23 420 A1    11/2000

(Continued)

OTHER PUBLICATIONS

Chinese Office Action issued in Chinese Application No. 200880017899.0 dated Jun. 1, 2012 (with translation) (10 pages).

*Primary Examiner* — John Kwon
(74) *Attorney, Agent, or Firm* — Sughrue Mion, PLLC

(57) ABSTRACT

A control apparatus for an internal combustion engine (10) includes intake valve control means (50). The internal combustion engine (10) includes a variable intake valve operating mechanism (66) that changes a valve opening characteristic of an intake valve (64), and rich combustion is performed in the internal combustion engine (10) to control an exhaust gas purification catalyst (24) disposed in an exhaust passage (18). The intake valve control means (50) controls the valve opening characteristic of the intake valve (64) to increase a flow rate of intake air in an early stage of an intake stroke when the rich combustion is performed, as compared to when non-rich combustion is performed.

12 Claims, 7 Drawing Sheets

U.S. PATENT DOCUMENTS

| | | | |
|---|---|---|---|
| 7,725,243 B2 * | 5/2010 | Natsui et al. | 701/105 |
| 2004/0011025 A1 | 1/2004 | Gui et al. | |
| 2008/0275621 A1 * | 11/2008 | Kobayashi | 701/103 |

FOREIGN PATENT DOCUMENTS

| | | |
|---|---|---|
| EP | 0 828 068 A2 | 3/1998 |
| FR | 2 838 771 A1 | 10/2003 |
| JP | 08-218920 A | 8/1996 |
| JP | 2000-320359 A | 11/2000 |
| JP | 2001-159363 A | 6/2001 |
| JP | 2001-280181 A | 10/2001 |
| JP | 2002-227630 A | 8/2002 |
| JP | 2003-083141 A | 3/2003 |
| JP | 2003-120267 A | 4/2003 |
| JP | 2003-148225 A | 5/2003 |
| JP | 2004-183491 A | 7/2004 |
| JP | 2004-257331 A | 9/2004 |
| JP | 2005-533959 A | 11/2005 |
| WO | 2004/009972 A1 | 1/2004 |

* cited by examiner

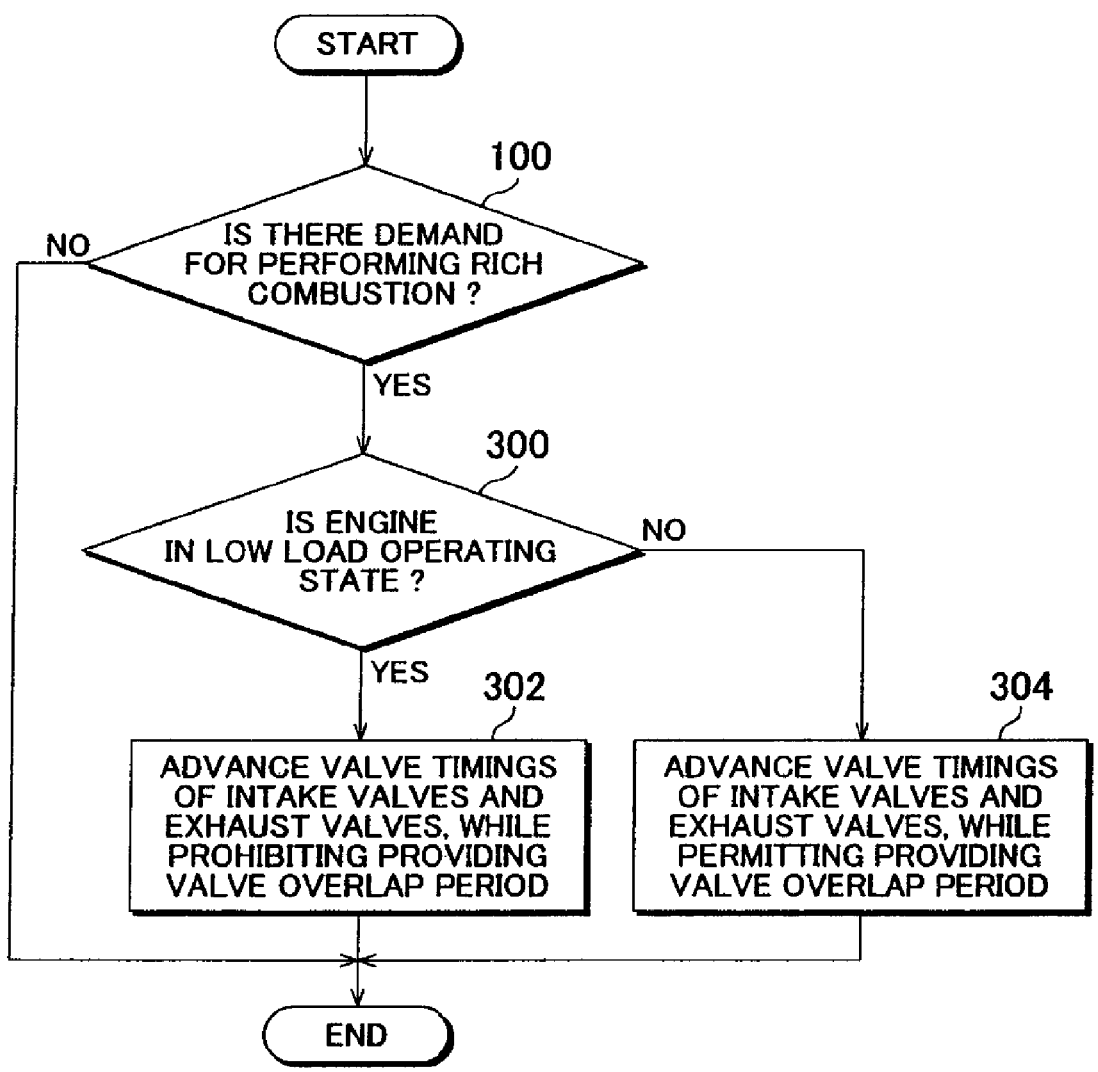

CONTROL APPARATUS AND CONTROL METHOD FOR INTERNAL COMBUSTION ENGINE

BACKGROUND OF THE INVENTION

1. Field of the Invention

The invention relates to a control apparatus and a control method for an internal combustion engine.

2. Description of the Related Art

Japanese Patent Application Publication No. 2003-148225 describes an exhaust gas purification apparatus for a diesel engine that includes a variable valve operating mechanism that changes valve opening characteristics of an intake valve and an exhaust valve. In the above-described apparatus, when the temperature of an exhaust gas purification catalyst is lower than a predetermined value, the amount of internal EGR gas is increased by adjusting a positive or negative valve overlap period. In the above-described apparatus, the temperature of the exhaust gas purification catalyst is increased by the control.

A method, in which combustion is performed at a rich air-fuel ratio in a cylinder (i.e., rich combustion is performed) to increase the temperature of an exhaust gas purification catalyst disposed in an exhaust passage, or to reduce the exhaust gas purification catalyst, is available. When the rich combustion is performed, it is difficult to stabilize the combustion.

SUMMARY OF THE INVENTION

The invention provides a control apparatus and a control method for an internal combustion engine, which appropriately increase combustion stability when rich combustion is performed to control an exhaust gas purification catalyst.

A first aspect of the invention relates to a control apparatus for an internal combustion engine. The internal combustion engine includes a variable intake valve operating mechanism that changes a valve opening characteristic of an intake valve, and rich combustion is performed in the internal combustion engine to control an exhaust gas purification catalyst disposed in an exhaust passage. The control apparatus includes intake valve control means for controlling the valve opening characteristic of the intake valve to increase a flow rate of intake air in an early stage of an intake stroke when the rich combustion is performed, as compared to when non-rich combustion is performed.

According to the first aspect, when the rich combustion is performed, the flow rate of intake air is increased in the early stage of the intake stroke. Therefore, it is possible to effectively increase the strength of a swirl in the early stage of the intake stroke, which is important for generation of the swirl. Thus, it is possible to appropriately increase combustion stability when the rich combustion is performed.

In the first aspect, the control apparatus may further include a variable exhaust valve operating mechanism that changes a valve opening characteristic of an exhaust valve; and exhaust valve control means for executing a control that advances a closing timing of the exhaust valve when the rich combustion is performed, as compared to when the non-rich combustion is performed.

According to the first aspect, unlike the conventional method in which the positive or negative valve overlap period is adjusted, almost all the gas (EGR gas) that remains in the cylinder after the exhaust valve is closed is returned to an intake side. Therefore, the amount of air-fuel mixture (new air and the EGR gas) taken into the cylinder during the intake stroke becomes largest, as compared to when the conventional method is used. Accordingly, the effect of increasing the strength of the swirl becomes largest.

In the first aspect, the control apparatus may further include a variable exhaust valve operating mechanism that changes a valve opening characteristic of an exhaust valve, and exhaust valve control means for executing a control that advances a closing timing of the exhaust valve when the rich combustion is performed, as compared to when the non-rich combustion is performed; and when the rich combustion is performed, the intake valve control means may execute a control that advances an opening timing of the intake valve, as compared to when the non-rich combustion is performed.

According to the first aspect, when the rich combustion is performed, by advancing the opening timing of the intake valve, it is possible to increase the flow rate of intake air in the early stage of the intake stroke. Therefore, it is possible to effectively increase the strength of a swirl in the early stage of the intake stroke, which is important for generation of the swirl. Also, by advancing the closing timing of the exhaust valve, almost all the gas (EGR gas) that remains in the cylinder after the exhaust valve is closed is returned to an intake side when the intake valve is opened, unlike the conventional method in which the positive or negative valve overlap period is adjusted. Therefore, the amount of air-fuel mixture (new air and the EGR gas) taken into the cylinder during the intake stroke becomes largest, as compared to when the conventional method is used. Accordingly, the effect of increasing the strength of the swirl becomes largest. Thus, it is possible to appropriately increase the combustion stability when the rich combustion is performed.

When the rich combustion is performed, the exhaust valve control means may execute a control that advances an opening timing of the exhaust valve, as compared to when the non-rich combustion is performed.

According to the first aspect, by advancing the opening timing of the exhaust valve, it is possible to increase the temperature of the exhaust gas and the temperature of the EGR gas. This further increases the combustion stability when the rich combustion is performed.

In the first aspect, when the rich combustion is performed, the intake valve control means may execute a control that advances a closing timing of the intake valve, as compared to when the non-rich combustion is performed.

According to the first aspect, by advancing the closing timing of the intake valve, it is possible to increase an actual compression ratio. Thus, the rich combustion is more appropriately stabilized by an increase in a compression end temperature.

In the first aspect, in a case where the rich combustion is performed when the internal combustion engine is in a low load operating state, the intake valve control means may set an amount by which the opening timing of the intake valve is advanced, and an amount by which the closing timing of the intake valve is advanced, and the exhaust valve control means may set an amount by which the opening timing of the exhaust valve is advanced, and an amount by which the closing timing of the exhaust valve is advanced so that a valve overlap period, in which a valve opening period of the intake valve overlaps with a valve opening period of the exhaust valve, is not provided.

According to the first aspect, in the case where the rich combustion is performed when the internal combustion engine is in a low load operating state, at least the opening timing of the intake valve and the closing timing of the exhaust valve are advanced, and the valve overlap period is prohibited from being provided. Thus, the fuel efficiency is deteriorated to a large extent due to an increase in the pumping loss as compared to when using the conventional method in which the negative valve overlap period is adjusted. However, the operating load of the internal combustion engine is increased, and thus, the rich combustion is stabilized, as compared to when the conventional method is used.

A second aspect of the invention relates to a control method for an internal combustion engine. The internal combustion engine includes a variable intake valve operating mechanism that changes a valve opening characteristic of an intake valve, and rich combustion is performed in the internal combustion engine to control an exhaust gas purification catalyst disposed in an exhaust passage. The control method includes controlling the valve opening characteristic of the intake valve to increase a flow rate of intake air in an early stage of an intake stroke when the rich combustion is performed, as compared to when non-rich combustion is performed.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein:

FIG. 7 is a flowchart of a routine executed in a third embodiment of the invention.

DETAILED DESCRIPTION OF EMBODIMENTS

Figure 1:
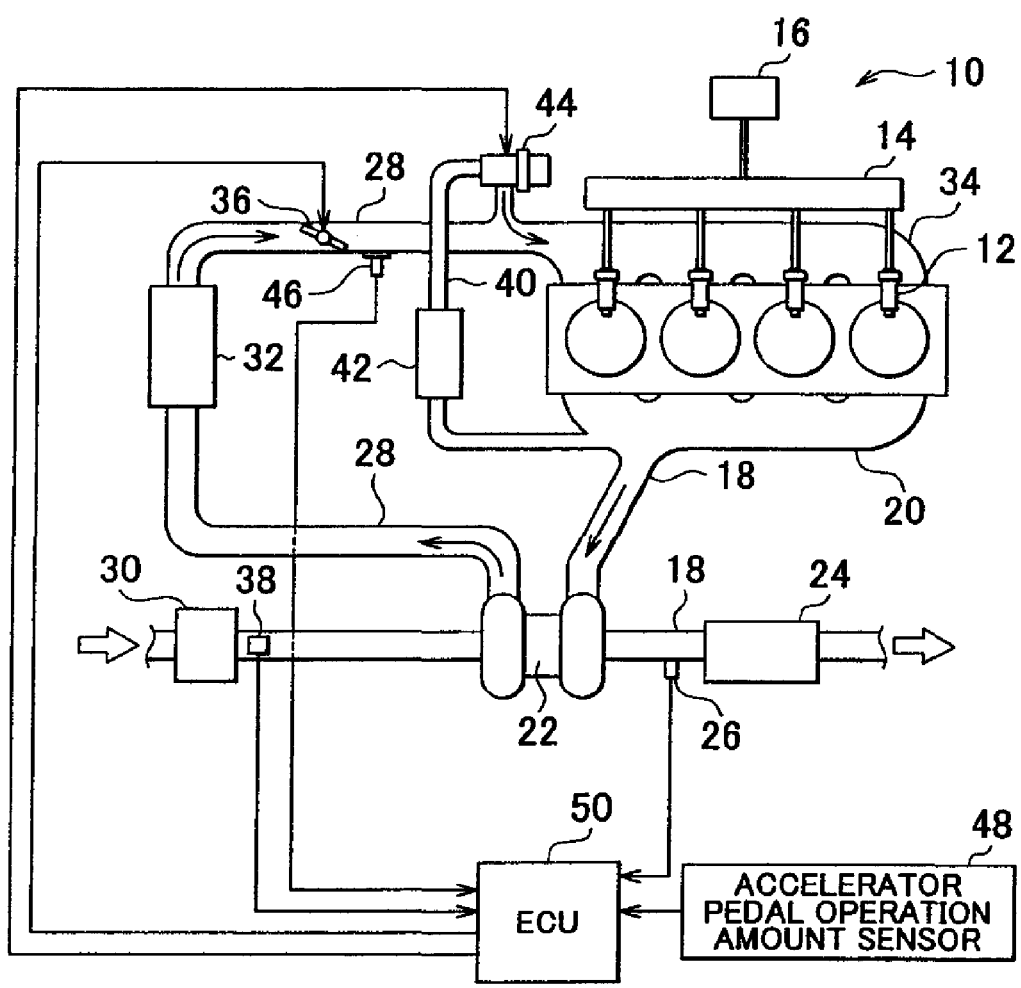
FIG. 1 shows the configuration of a system in a first embodiment of the invention.

First Embodiment [Description of the Configuration of a System] FIG. 1 shows the configuration of a system in a first embodiment of the invention. The system shown in FIG. 1 includes an internal combustion engine 10. The internal combustion engine 10 is a four-cycle diesel engine (compression ignition internal combustion engine). An injector 12 is provided for each cylinder of the internal combustion engine 10 to inject fuel directly into the cylinder. The injectors 12 for the cylinders are connected to a common rail 14 that is common to the injectors 12. Fuel in a fuel tank (not shown) is pressurized to a predetermined fuel pressure by a supply pump 16, and then stored in the common rail 14. The fuel is supplied from the common rail 14 to the injectors 12.

An exhaust passage 18 for the internal combustion engine 10 is connected to an exhaust manifold 20 that has branch passages. The branch passages are connected to exhaust ports of the respective cylinders. The internal combustion engine 10 in the first embodiment includes a turbocharger 22. The exhaust passage 18 is connected to an exhaust turbine of the turbocharger 22.

In the exhaust passage 18, an exhaust gas purification device 24, which purifies exhaust gas, is disposed downstream of the turbocharger 22. For example, one of an oxidation catalyst, a storage reduction type or selective reduction type NOx catalyst, a Diesel Particulate Filter (DPF), and a Diesel Particulate-NOx-Reduction system (DPNR) may be used as the exhaust gas purification device 24. Alternatively, two or more of the oxidation catalyst, the storage reduction type or selective reduction type NOx catalyst, the DPF, and the DPNR may be used in combination. Also, in the exhaust gas passage 18, an exhaust gas temperature sensor 26, which detects an exhaust gas temperature, is disposed downstream of the turbocharger 22.

An air cleaner 30 is provided close to an inlet of the intake passage 28 for the internal combustion engine 10. Air, which is taken through the air cleaner 30, is compressed by an intake air compressor of the turbocharger 22, and then cooled by an intercooler 32. After the intake air passes through the intercooler 32, the intake air is distributed to intake ports of the cylinders through an intake manifold 34.

In the intake passage 28, an intake throttle valve 36 is provided at a position between the intercooler 32 and the intake manifold 34. Also, in the intake passage 28, an airflow meter 38, which detects an intake air amount, is provided downstream of, and close to the air cleaner 30.

One end of an external Exhaust Gas Recirculation (EGR) passage 40 is connected to the intake passage 28 at a position close to the intake manifold 34. The other end of the external EGR passage 40 is connected to the exhaust passage 18 at a position close to the exhaust manifold 20. In the system, part of exhaust gas (burned gas) can be returned to the intake passage 28 through the external EGR passage 40, that is, an external Exhaust Gas Recirculation (EGR) control can be executed.

An EGR cooler 42, which cools the external EGR gas, is provided in the external EGR passage 40. In the external EGR passage 40, an EGR valve 44 is provided downstream of the EGR cooler 42. By increasing an opening amount of the EGR valve 44, it is possible to increase an amount of the exhaust gas that passes through the external EGR passage 40, that is, an amount of external EGR gas.

In the intake passage 28, an intake air pressure sensor 46, which detects an intake air pressure, is provided downstream of the intake throttle valve 36. Further, the system includes an accelerator pedal operation amount sensor 48 that detects a depression amount of an accelerator pedal (i.e., an accelerator pedal operation amount) for a vehicle in which the internal combustion engine 10 is provided.

The system in the first embodiment includes an Electronic Control Unit (ECU) 50. The ECU 50 is connected to the above-described sensors and actuators. The ECU 50 controls the operating state of the internal combustion engine 10 by driving the actuators according to predetermined programs, based on signals and information.

Figure 2:
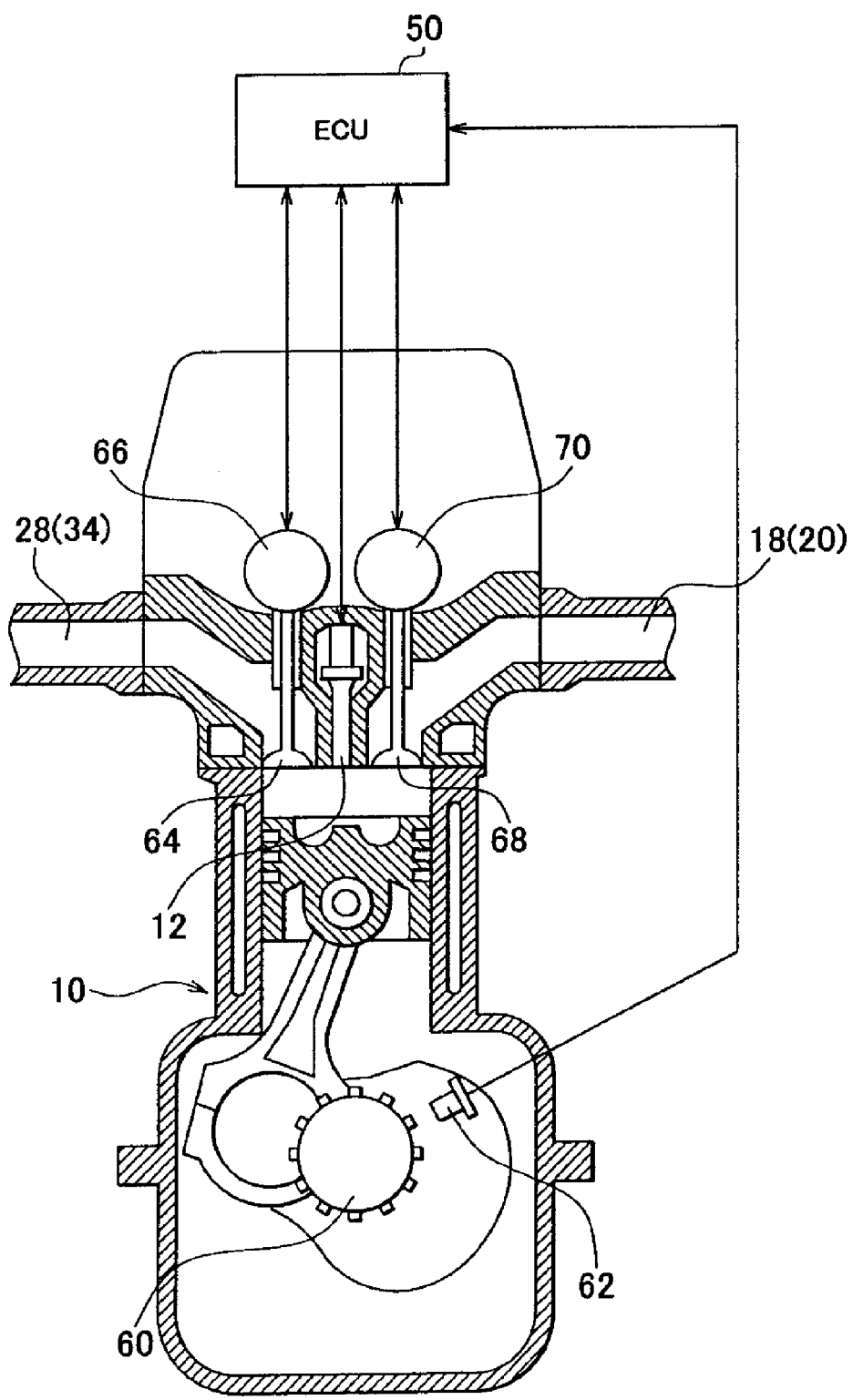
FIG. 2 is a cross sectional view showing one cylinder of an internal combustion engine in the system shown in FIG. 1.

FIG. 2 is a cross sectional view showing one cylinder of the internal combustion engine 10 in the system shown in FIG. 1. Hereinafter, the internal combustion engine 10 will be further described. As shown in FIG. 2, a crank angle sensor 62, which detects a rotational angle (crank angle) of a crankshaft 60, is provided close to the crankshaft 60 of the internal combustion engine 10. The crank angle sensor 62 is connected to the ECU 50. An engine speed and the like are detected based on a signal from the crank angle sensor 62.

The internal combustion engine 10 includes a variable intake valve operating mechanism 66 and a variable exhaust valve operating mechanism 70. The variable intake valve operating mechanism 66 continuously changes a valve opening characteristic of intake valves 64. The variable exhaust valve operating mechanism 70 continuously changes a valve opening characteristic of exhaust valves 68. In the internal combustion engine 10, the two intake valves 64 and the two exhaust valves 68 are provided for each cylinder.

The variable intake valve operating mechanism 66 and the variable exhaust valve operating mechanism 70 are connected to the ECU 50. The configurations of the variable intake valve operating mechanism 66 and the variable exhaust valve operating mechanism 70 are not limited to specific configurations. The variable intake valve operating mechanism 66 is an electromagnetically-driven valve mechanism that opens/closes the intake valves 64 using an electromagnetic force. The variable exhaust valve operating mechanism 70 is a Variable Valve Timing (VVT) mechanism that continuously changes a phase of a cam (not shown) that drives the exhaust valves 68.

In the system with the above-described configuration in the first embodiment, combustion (hereinafter, referred to as "rich combustion") is performed at a rich air-fuel ratio in a cylinder under a predetermined operating condition, to increase the temperature of an exhaust gas purification catalyst of the exhaust gas purification device 24, such as a NOx catalyst, or reduce the exhaust gas purification catalyst. Examples of the rich combustion include low-temperature combustion and premix charge compression ignition (PCCI) combustion. The low-temperature combustion is performed by decreasing a combustion temperature by introducing the external EGR gas, and advancing a fuel injection timing with respect to a compression top dead center by approximately 20° CA. The PCCI combustion is performed by advancing the fuel injection timing with respect to the compression top dead center by approximately 90° CA.

Figure 3:
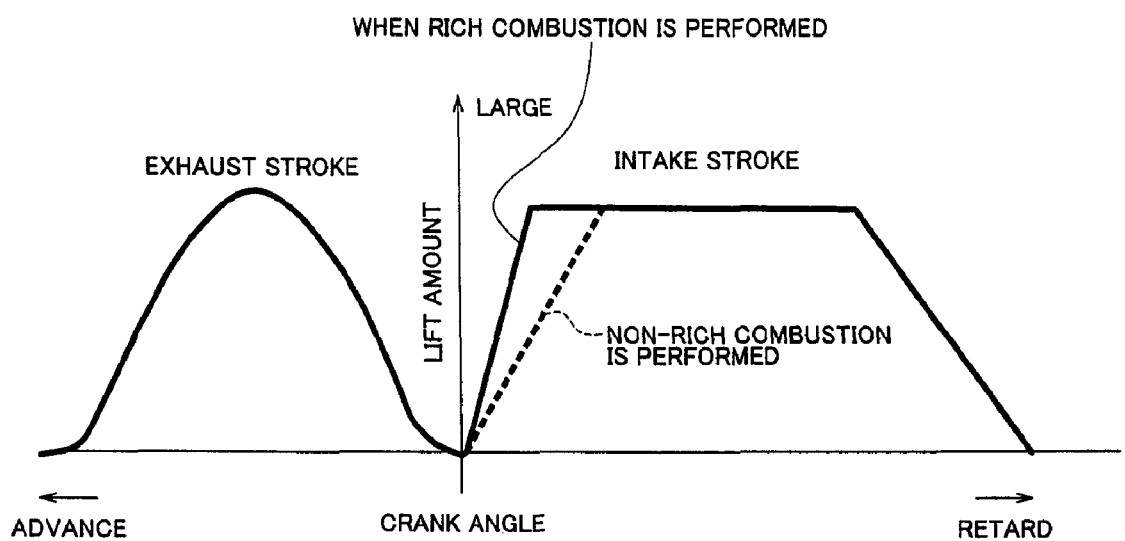
FIG. 3 illustrates a characteristic control for intake valves in the first embodiment of the invention.

FIG. 3 illustrates a characteristic control for the intake valves 64 in the first embodiment of the invention. When the rich combustion is performed, it is likely to be difficult to stabilize combustion. Also, because compression self ignition is performed in the internal combustion engine 10 that is a diesel engine, particularly when an in-cylinder temperature is low, for example, when the internal combustion engine 10 is in a low load operating state, the rich combustion is unlikely to be stabilized.

Accordingly, in the system in the first embodiment, when the rich combustion is performed, a lift amount of the intake valves 64 in an early stage of an intake stroke is increased, as compared to when non-rich combustion is performed (i.e., when normal lean combustion is performed). This increases a flow rate of intake air in the early stage of the intake stroke.

Figure 4:
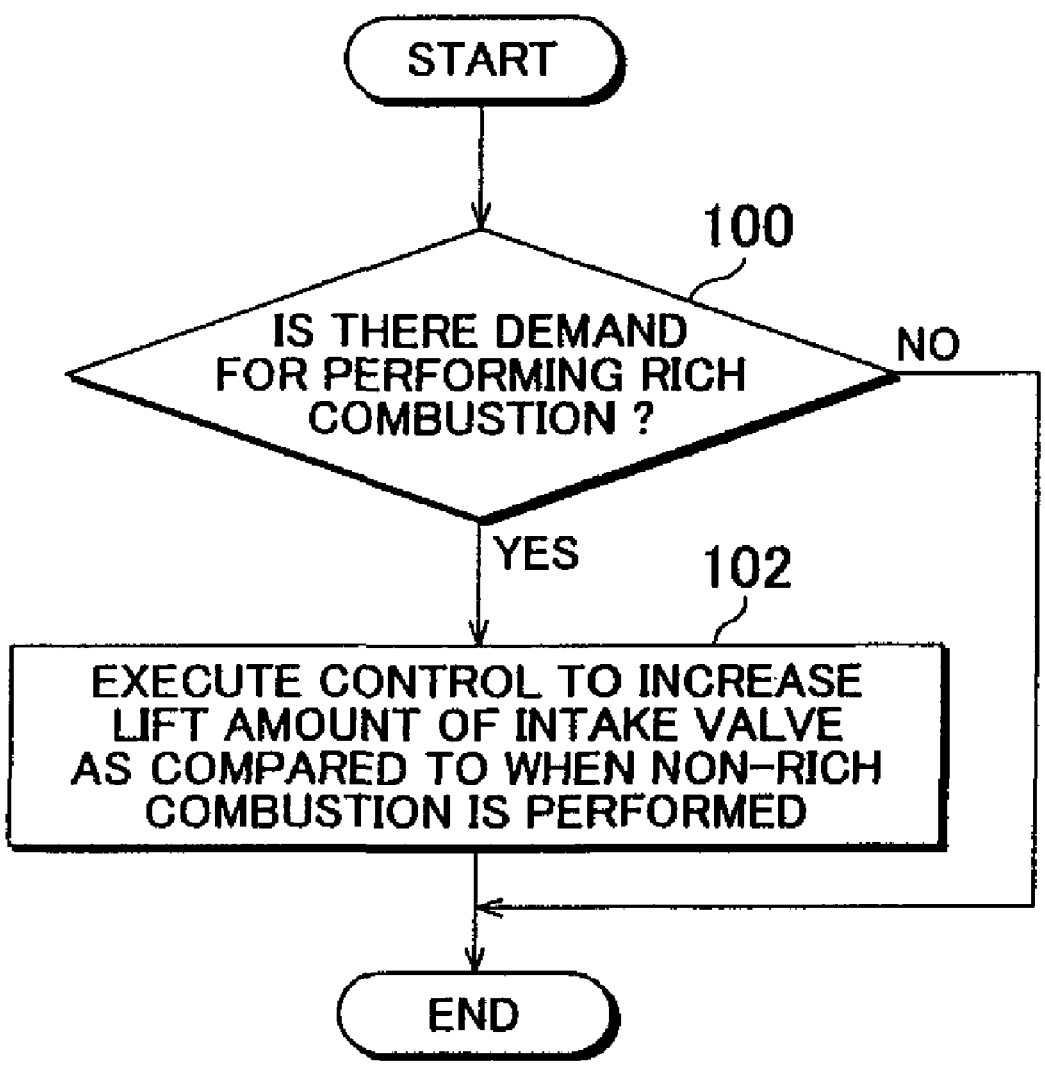
FIG. 4 is a flowchart of a routine executed in the first embodiment of the invention.

FIG. 4 is a flowchart of a routine executed by the ECU 50 to perform the above-described function in the first embodiment. In the routine shown in FIG. 4, first, it is determined whether there is a demand for performing the rich combustion to increase the temperature of the exhaust gas purification catalyst or to reduce the exhaust gas purification catalyst, based on results of processing of signals from the sensors connected to the ECU 50 (step 100).

When it is determined that there is a demand for performing the rich combustion, the control for the intake valves 64 is executed to increase the lift amount of the intake valves 64 in the early stage of the intake stroke, as compared to when the non-rich combustion is performed (step 102). More specifically, the control for the intake valves 64 is implemented by increasing a lift speed of the intake valves 64 at a valve-opening time using the variable intake valve operating mechanism 66, as compared to when the non-rich combustion is performed.

According to the above-described routine shown in FIG. 4, when the rich combustion is performed, it is possible to increase the flow rate of intake air in the early stage of the intake stroke. Therefore, it is possible to effectively increase the strength of a swirl in the early stage of the intake stroke, which is important for generation of the swirl. Also, in this method, it is possible to increase the strength of the swirl of intake air introduced into the cylinder from both of the two intake valves 64.

More specifically, the method of increasing the strength of the swirl in the first embodiment has advantageous effects described below, as compared to an ordinary method in which the strength of the swirl is increased by limiting the flow rate of intake air flowing in one of two intake ports, for example, by executing a control that closes one of swirl control valves or intake valves early.

That is, according to the above-described ordinary method, it is possible to increase the strength of flow from a main intake port that is configured as, for example, a tangential port. Therefore, the strength of the swirl is increased at an outer peripheral portion in the cylinder. However, the strength of the swirl is not much increased at a center portion in the cylinder. Also, because the strength of the swirl is increased only at the outer peripheral portion, heat loss in a wall surface of a combustion chamber may be increased, and the in-cylinder temperature may be decreased.

In contrast, according to the method in the first embodiment, it is possible to increase not only the strength of the flow from the main intake port, but also the strength of the flow from a subsidiary intake port that is configured as a helical port. That is, it is possible to effectively increase the strength of the swirl not only at the outer peripheral portion in the cylinder, but also at the center portion in the cylinder. Thus, it is possible to directly increase the strength of the swirl in the cylinder. Also, because the strength of the swirl is increased at the center portion, it is possible to avoid an increase in heat loss in the wall surface of the combustion chamber. This suppress a decrease in the in-cylinder temperature. Therefore, it is possible to appropriately stabilize the rich combustion when the internal combustion engine 10 is in a low-load operating state.

Further, according to the method in the first embodiment, because the strength of the swirl is increased at the center portion and the outer peripheral portion, an air density at the outer peripheral portion is increased. Therefore, the strength of a squish flow is increased, and thus, the strength of turbulence of the gas in the cylinder is increased. As a result, the strength of the swirl and the strength of the squish flow are appropriately increased. This increases an air utilization rate in the entire combustion chamber.

As described above, according to the method in the first embodiment, when the rich combustion is performed, it is possible to effectively increase the strength of the swirl of intake air introduced into the cylinder from both of the two intake valves 64 in the early stage of the intake stroke. Therefore, it is possible to appropriately increase the combustion stability when the rich combustion is performed.

In the first embodiment, when the rich combustion is performed, the lift amount of the intake valves 64 is increased by increasing the lift speed, in the early stage of the intake stroke. However, in the invention, the method of increasing the flow rate of intake air in the early stage of the intake stroke is not limited to this method. For example, it is possible to employ a method in which the variable intake valve operating mechanism includes a VVT mechanism as well as the variable exhaust valve operating mechanism, and an opening timing of the intake valves 64 is advanced as compared to when the non-rich combustion is performed.

By advancing the opening timing of the intake valves 64, it is possible to increase the lift amount of the intake valves 64, and to increase the flow rate of intake air in the early stage of the intake stroke. Also, by employing this method, it is possible to increase the strength of the swirl of intake air introduced into the cylinder from both of the two intake valves 64. Thus, it is possible to obtain the same advantageous effects as those obtained in the first embodiment. Also, by advancing the opening timing of the intake valves 64 with respect to an intake top dead center, exhaust gas flows into the intake ports, and therefore, an internal EGR rate is increased. This suppresses a decrease in the in-cylinder temperature due to the increase in the strength of the swirl.

It may be necessary to provide a valve recess in a piston to prevent the intake valves 64 from contacting the piston, when the opening timing of the intake valves 64 is advanced. When the valve recess is provided, the strength of the squish flow is decreased, and thus, the strength of turbulence of the gas in the cylinder is decreased. However, according to the method in the first embodiment, by increasing the strength of the swirl at the center portion and the outer peripheral portion in the cylinder, it is possible to increase the strength of the squish flow, and the strength of the turbulence of the gas in the cylinder, while avoiding an increase in the heat loss in the wall surface of the combustion chamber. Thus, it is also possible to suppress the problem relating to the valve recess.

In the first embodiment, when the ECU 50 executes the processes in the routine shown in FIG. 4, "the intake valve control means" in the first aspect may be implemented.

Second Embodiment Next, a second embodiment of the invention will be described with respect to FIG. 5 and FIG. 6. The system in the second embodiment has the same hardware configuration as that shown in FIG. 1 and FIG. 2, except that the variable intake valve operating mechanism 66 is constituted by the same VVT mechanism as that of the variable exhaust valve operating mechanism 70. When the ECU 50 executes a routine shown in FIG. 6 using the hardware configuration, instead of the routine shown in FIG. 4, the system in the second embodiment may be implemented.

Figure 5:
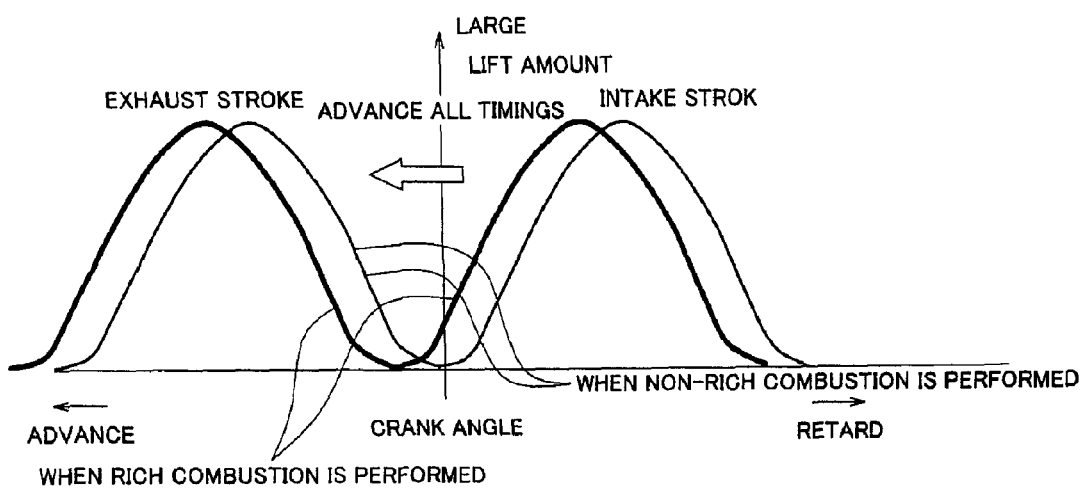
FIG. 5 illustrates a characteristic control for the intake valves and exhaust valves in a second embodiment of the invention.

FIG. 5 illustrates a characteristic control for the intake valves 64 and the exhaust valves 68 in the second embodiment of the invention. As shown in FIG. 5, in the system in the second embodiment, when the rich combustion is performed to increase the temperature of the exhaust gas purification catalyst or to reduce the exhaust gas purification catalyst, the opening timing and the closing timing of the intake valves 64, and the opening timing and the closing timing of the exhaust valves 68 are all advanced with respect to the valve timings of the intake valves 64 and the exhaust valves 68 when the non-rich combustion is performed.

Figure 6:
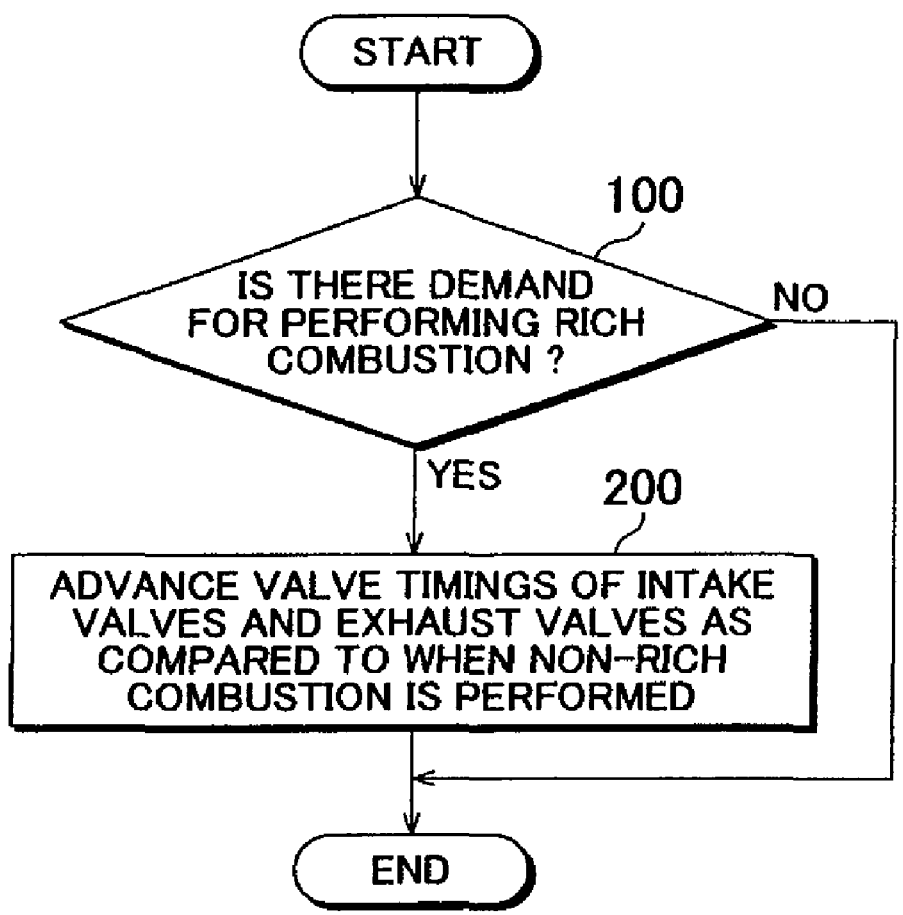
FIG. 6 is a flowchart of a routine executed in the second embodiment of the invention.

FIG. 6 is a flowchart of a routine executed by the ECU 50 to perform the above-described function in the second embodiment. In FIG. 6, the same steps as those in FIG. 4 are denoted by the same reference numerals, and the description thereof will be omitted or simplified. In the routine shown in FIG. 6, when it is determined that there is a demand for performing the rich combustion in step 100, a control is executed to advance the opening timing and the closing timing of the intake valves 64 and the opening timing and the closing timing of the exhaust valves 68 with respect to the valve timings of the intake valves 64 and the exhaust valves 68 when the non-rich combustion is performed (step 200).

In addition, according to the method of controlling the intake valves 64 and the exhaust valves 68 in step 200, the valve timings of the intake valves 64 and the exhaust valves 68 are advanced, that is, the valve timings of the intake valves 64 and the exhaust valves 68 are changed in the same direction. In contrast, according to a conventional method in which a positive valve overlap period is adjusted, when the overlap period is increased, the valve timing of the exhaust valve is retarded, and the valve timing of the intake valve is advanced. That is, the valve timing of the intake valve is changed in a direction opposite to the direction in which the valve timing of the exhaust valve is changed. According to a conventional method in which a negative valve overlap period is provided, when the overlap period is increased, the valve timing of the exhaust valve is advanced, and the valve timing of the intake valve is retarded. In this case as well, the valve timing of the intake valve is changed in a direction opposite to the direction in which the valve timing of the exhaust valve is changed. Thus, the method of controlling the intake valves 64 and the exhaust valves 68 when the rich combustion is performed is greatly different from any conventional method.

According to the routine shown in FIG. 6, when the rich combustion is performed, the valve timings of the intake valves 64 and the exhaust valves 68 are advanced. Thus, it is possible to obtain the advantageous effects described below. That is, by opening the intake valves 64 early and closing the exhaust valves 68 early, it is possible to obtain a sufficient amount of the internal EGR gas. Also, by closing the intake valves 64 early, it is possible to increase an actual compression ratio. Also, by opening the exhaust valves 68 early, it is possible to increase the temperature of the exhaust gas and the temperature of the EGR gas. In addition, the operating load of the internal combustion engine 10 is increased to compensate for a decrease in expansion work, which is caused by opening the exhaust valves 68 early. Thus, according to the method in the second embodiment, it is possible to appropriately stabilize the rich combustion by combining the above-described advantageous effects.

In addition, according to the method in the second embodiment, because the operating load needs to be increased, fuel efficiency is decreased, as compared to the method in which the amount of the internal EGR gas is increased by increasing the positive or negative valve overlap period when the rich combustion is performed. However, the rich combustion for controlling the exhaust gas purification catalyst is required to reduce exhaust emissions. According to the method in the second embodiment, it is possible to appropriately stabilize the rich combustion by permitting deterioration of the fuel efficiency and increasing the operating load, as compared to the conventional method in which the positive or negative valve overlap period is adjusted.

Next, advantageous effects obtained by opening the intake valves 64 early, closing the exhaust valves 68 early, opening the exhaust valves 68 early, and closing the intake valves 64 early will be separately described in detail. The advantageous effects obtained by opening the intake valves 64 early have been described in the first embodiment.

First, the advantageous effects obtained by closing the exhaust valves 68 early, in addition to opening the intake valves 64 early will be described. By executing the control that closes the exhaust valves 68 early, in addition to opening the intake valves 64 early, the amount of exhaust gas that remains in the cylinder during the exhaust stroke is increased. Therefore, the amount of the internal EGR gas is increased, as compared to when the intake valves 64 are opened early but the exhaust valves 68 are not closed early. Also, unlike the conventional method in which the positive or negative valve overlap period is adjusted, almost all the gas (EGR gas) that remains in the cylinder after the exhaust valves 68 are closed is returned to the intake side when the intake valves 64 are opened. Therefore, an amount of air-fuel mixture (new air and the EGR gas) taken into the cylinder during the intake stroke becomes largest, as compared to when the conventional method is used. Accordingly, the effect of increasing the strength of the swirl becomes largest. When the internal EGR control is executed, the new air and the EGR gas may not sufficiently mixed with each other (i.e., so-called stratified EGR operation may be performed). However, according to the method in the second embodiment, almost all the gas that remains in the cylinder is returned to the intake side. Therefore, the new air and the EGR gas are appropriately mixed with each other in the intake manifold 34. Thus, it is possible to execute the internal EGR control using homogenous air-fuel mixture. Further, because the internal EGR gas is returned only to the intake side, the temperature of the gas is increased by throttle loss (pumping loss) when the gas is blown back to the intake side through the intake valves 64. Because the EGR gas whose temperature has been increased is taken into the cylinder again, it is possible to increase the above-described effect of suppressing the decrease in the in-cylinder temperature, which is obtained by opening the intake valves 64 early.

Next, the advantageous effects obtained by opening the exhaust valves 68 early will be described. By opening the exhaust valves 68 early, the temperature of the exhaust gas and the temperature of the EGR gas are increased, as described above. Thus, it is possible to further increase the above-described effect of suppressing the decrease in the in-cylinder temperature, which is obtained by opening the intake valves 64 early and closing the exhaust valves 68 early. Also, because a temperature difference between the gas in the cylinder and the intake air is increased by the increase in the in-cylinder temperature, an injection speed, at which the gas flowing in the intake manifold 34 is injected when the intake valves 64 are opened, is increased. Thus, the mixing of the new air and the EGR gas is promoted, and the temperature of the gas is increased by the increase in the throttle loss (pumping loss) when the gas passes through the intake valves 64. Also, in general, when the internal EGR control is used, the amount of the gas discharged to the exhaust passage 18 is decreased, and thus, exhaust energy is decreased. The decrease in the exhaust energy leads to insufficient supercharging. As a result, the combustion stability is decreased due to a decrease in compression end pressure. Due to the decrease in the combustion stability, it becomes necessary to decrease the amount of the EGR gas. This decreases the in-cylinder temperature. When the internal EGR control is used, this negative cycle may occur. However, in the second embodiment, by opening the exhaust valves 68 early, sufficient exhaust energy is supplied to the exhaust passage 18, and thus, occurrence of the above-described problem is suppressed when the internal EGR control is used.

Next, advantageous effects obtained by closing the intake valves 64 early will be described. By closing the intake valves 64 early, it is possible to increase the actual compression ratio as described above. Thus, the rich combustion is appropriately stabilized by the increase in the compression end temperature. Also, the increase in the compression end temperature leads to an increase in the combustion temperature. This increases the temperature of the exhaust gas and the temperature of the EGR gas. Therefore, it is possible to further increase the above-described effect of suppressing the decrease in the in-cylinder temperature, which is obtained by opening the intake valves 64 early, closing the exhaust valves 68 early, and opening the exhaust valves 68 early. Also, because the strength of the squish flow is increased by the increase in the actual compression ratio, the strength of the swirl during the compression stroke is further increased. Therefore, it is possible to further increase the above-described effect of increasing the strength of the swirl, which is obtained by opening the intake valves 64 early, and closing the exhaust valves 68 early.

In the second embodiment, the VVT mechanism that changes only the phase of the opening timing of the intake valves 64 is used as the variable intake valve operating mechanism 66, and the VVT mechanism that changes only the phase of the opening timing of the exhaust valves 68 is used as the variable exhaust valve operating mechanism 70. Therefore, when early opening of the intake valves 64 and early closing of the exhaust valves 68 are performed, early opening of the exhaust valves 68 and early closing of the intake valves 64 are performed. However, the invention is not limited to the configuration where early opening of the intake valves 64, early closing of the exhaust valves 68, early opening of the exhaust valves 68, and early closing of the intake valves 64 are all performed. That is, for example the electomagnetically-driven valve mechanism may be used as each of the variable intake valve operating mechanism and the variable exhaust valve operating mechanism, and at least one of early closing of the exhaust valves 68, early opening of the exhaust valves 68, and early closing of the intake valves 64 is performed, together with early opening of the intake valves 64.

In the second embodiment, when the ECU 50 executes the processes in the routine shown in FIG. 6, "the exhaust valve control means" and "the intake valve control means" in the first aspect may be implemented.

Third Embodiment Next, a third embodiment of the invention will be described with reference to FIG. 7. When the ECU 50 executes a routine shown in FIG. 7 (described below), instead of the routine shown in FIG. 6, using the same hardware configuration as in the second embodiment (i.e., the hardware configuration in which the VVT mechanism is used as each of the variable intake valve operating mechanism 66 and the variable exhaust valve operating mechanism 70), the system in the third embodiment may be implemented.

As described above, when the internal combustion engine 10 is in a low load operating state, the in-cylinder temperature low, and therefore, it is difficult to stabilize the rich combustion. Accordingly, when the internal combustion engine 10 is in a low load operating state, the valve timings of the intake valves 64 and the exhaust valves 68 need to be sufficiently advanced. However, an amount by which the opening timing of the intake valves 64 is advanced is limited to prevent the intake valves 64 from contacting the piston. Also, when the internal combustion engine 10 is in a low load operating state, the combustion may become unstable if air and fuel are excessively mixed with each other. Thus, when the internal combustion engine 10 is in a low load operating state, it is required to increase the amount of the internal EGR gas to increase the in-cylinder temperature, while suppressing an excessive increase in the strength of the swirl.

In the third embodiment, in the case where the rich combustion is performed when the internal combustion engine 10 is in a predetermined low load state, the valve timings of the intake valves 64 and the exhaust valves 68 are advanced, while prohibiting providing a valve overlap period in which the intake valves 64 and the exhaust valves 68 are open (i.e., while preventing the intake valves 64 and the exhaust valves 68 from being opened at the same time). Also, when the internal combustion engine 10 is in a medium-to-high load operating state, and the valve timings of the intake valves 64 and the exhaust valves 68 are advanced, it is permitted to provide the valve overlap period.

FIG. 7 is a flowchart of a routine executed by the ECU 50 to perform the above-described function in the third embodiment. In FIG. 7, the same steps as those in FIG. 4 are denoted by the same reference numerals, and the description thereof will be omitted or simplified. In the routine shown in FIG. 7, when it is determined that there is a demand for performing the rich combustion in step 100, it is determined whether the internal combustion engine 10 is currently in a predetermined low load operating state (step 300).

When it is determined that the internal combustion engine 10 is currently in the predetermined low load operating state, a control is executed to advance the opening timing and closing timing of the intake valves 64 and the opening timing and the closing timing of the exhaust valves 68, with respect to the valve timings of the intake valves 64 and the exhaust valves 68 when the non-rich combustion is performed, while prohibiting providing the valve overlap period (step 302). More specifically, in step 302, the control is executed so that the opening timing and the closing timing of the intake valves 64 are not excessively advanced, and the opening timing and the closing timing of the exhaust valves 68 are sufficiently advanced as compared to the opening timing and the closing timing of the intake valves 64.

In step 300, when it is determined that the internal combustion engine 10 is not currently in the predetermined low load operating state, that is, when it is determined that the internal combustion engine 10 is in a medium-to-high load operating state, a control is executed to advance the opening timing and the closing timing of the intake valves 64 by an appropriate amount corresponding to the operating state with respect to the valve timings of the intake valves 64 when the non-rich combustion is performed, and to advance the opening timing and the closing timing of the exhaust valves 68 by an appropriate amount corresponding to the operating state with respect to the valves timings of the exhaust valves 68, while permitting providing the valve overlap period (step 304).

According to the above-described routine shown in FIG. 7, in the case where the rich combustion is performed when the internal combustion engine 10 is in the low load operating state, the valve timings of the intake valves 64 and the exhaust valves 68 are advanced while prohibiting providing the valve overlap period. When the intake valves 64 and the exhaust valves 68 are prevented from being opened at the same time while the valve timings of the intake valves 64 and the exhaust valves 68 are advanced, the gas that remains in the cylinder is compressed after the exhaust valves 68 are closed during the exhaust stroke. Then, after the remaining gas is compressed, the intake valves 64 are opened. Therefore, the amount of the internal EGR gas is sufficiently increased. Also, the flow speed of the gas is increased when the remaining gas is returned to the intake side through the intake valves 64. This increases throttle loss (pumping loss) when the gas passes through the intake valves 64. Therefore, it is possible to further increase the above-described effect of increasing the temperature of the gas, which is obtained by closing the exhaust valves 68 early in the second embodiment.

Because it is difficult to stabilize the rich combustion, if there is variation in the amount of the distributed EGR gas among the cylinders, a misfire may occur only in a certain cylinder. In contrast, according to the method in the third embodiment, the flow speed at which the gas passes through the intake valves 64 is increased, thereby increasing the strength of turbulence of the gas in the intake manifold 34. Therefore, it is possible to reduce the variation in the amount of distributed EGR gas among the cylinders. This also appropriately stabilizes the rich combustion.

Further, when the valve timings of the intake valves 64 and the exhaust valves 68 are advanced, and the valve overlap period is not provided as in the third embodiment, the fuel efficiency is deteriorated to a large extent due to an increase in the pumping loss, as compared to when using the conventional method in which the negative valve overlap period is adjusted. However, because the operating load of the internal combustion engine 10 is increased, the rich combustion is stabilized, as compared to when the conventional method is used.

The invention claimed is:

1. A control apparatus for an internal combustion engine, the control apparatus comprising:
a variable intake valve operating mechanism that changes a valve opening characteristic of an intake valve;
an exhaust gas purification catalyst disposed in an exhaust passage; and
an intake valve control unit that controls the valve opening characteristic of the intake valve to increase a flow rate of intake air at a beginning stage of an intake stroke during rich combustion, as compared to a flow rate of intake air at a beginning stage of an intake stroke during non-rich combustion.

2. The control apparatus according to claim 1, wherein the intake valve control unit executes a control that advances an opening timing of the intake valve during the rich combustion, as compared to an opening timing of the intake valve during the non-rich combustion.

3. The control apparatus according to claim 2, further comprising:
a variable exhaust valve operating mechanism that changes a valve opening characteristic of an exhaust valve; and
an exhaust valve control unit that executes a control that advances a closing timing of the exhaust valve during the rich combustion as compared to a closing timing of the exhaust valve during the non-rich combustion.

4. The control apparatus according to claim 3, wherein the exhaust valve control unit executes a control that advances an opening timing of the exhaust valve during the rich combustion, as compared to an opening timing of the exhaust valve during the non-rich combustion.

5. The control apparatus according to claim 3, wherein during the rich combustion when the internal combustion engine is in a low load operating state, the intake valve control unit sets an amount by which the opening timing of the intake valve is advanced, and an amount by which a closing timing of the intake valve is advanced, and the exhaust valve control unit sets an amount by which an opening timing of the exhaust valve is advanced, and an amount by which the closing timing of the exhaust valve is advanced so that a valve overlap period, in which a valve opening period of the intake valve overlaps with a valve opening period of the exhaust valve, is not provided.

6. The control apparatus according to claim 1, wherein the intake valve control unit executes a control that advances a closing timing of the intake valve during the rich combustion, as compared to a closing timing of the intake valve during the non-rich combustion.

7. The control apparatus according to claim 6, further comprising:
a variable exhaust valve operating mechanism that changes a valve opening characteristic of an exhaust valve; and
an exhaust valve control unit that executes a control that advances a closing timing of the exhaust valve during the rich combustion, as compared to a closing timing of the exhaust valve during the non-rich combustion.

8. The control apparatus according to claim 7, wherein the exhaust valve control unit executes a control that advances an opening timing of the exhaust valve during the rich combustion, as compared to an opening timing of the exhaust valve during the non-rich combustion.

9. The control apparatus according to claim 7, wherein during the rich combustion when the internal combustion engine is in a low load operating state, the intake valve control unit sets an amount by which the opening timing of the intake valve is advanced, and an amount by which a closing timing of the intake valve is advanced, and the exhaust valve control unit sets an amount by which an opening timing of the exhaust valve is advanced, and an amount by which the closing timing of the exhaust valve is advanced so that a valve overlap period, in which a valve opening period of the intake valve overlaps with a valve opening period of the exhaust valve, is not provided.

10. The control apparatus according to claim 1, wherein the intake valve control unit increases a lift amount of the intake valve during the rich combustion, as compared to a lift amount of the intake valve during the non-rich combustion.

11. The control apparatus according to claim 1, wherein the variable intake valve operating mechanism is operable for continuously changing the valve opening characteristic of the intake valve.

12. A control method for an internal combustion engine, wherein the internal combustion engine includes a variable intake valve operating mechanism that changes a valve opening characteristic of an intake valve, and rich combustion is performed in the internal combustion engine to control an exhaust gas purification catalyst disposed in an exhaust passage, the control method comprising:

controlling the valve opening characteristic of the intake valve to increase a flow rate of intake air at a beginning stage of an intake stroke during rich combustion, as compared to a flow rate of intake air at a beginning stage of an intake stroke during non-rich combustion.

* * * * *